(12) United States Patent
Ebi

(10) Patent No.: US 7,010,427 B2
(45) Date of Patent: Mar. 7, 2006

(54) ROUTE GUIDANCE SYSTEM HAVING VOICE GUIDANCE CAPABILITY

(75) Inventor: Masaki Ebi, Kariya (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 10/817,932

(22) Filed: Apr. 6, 2004

(65) Prior Publication Data

US 2004/0204828 A1    Oct. 14, 2004

(30) Foreign Application Priority Data

Apr. 8, 2003  (JP)  ............................. 2003-104398

(51) Int. Cl.
*G01C 21/26* (2006.01)

(52) U.S. Cl. ...................... 701/210; 701/211
(58) Field of Classification Search ...................... None
See application file for complete search history.

(56) References Cited

U.S. PATENT DOCUMENTS

| | | | |
|---|---|---|---|
| 5,948,040 A * | 9/1999 | DeLorme et al. | 701/201 |
| 6,298,305 B1 * | 10/2001 | Kadaba et al. | 701/211 |
| 6,347,299 B1 | 2/2002 | Holzman et al. | |
| 6,456,934 B1 * | 9/2002 | Matsunaga et al. | 701/210 |

FOREIGN PATENT DOCUMENTS

| | | |
|---|---|---|
| EP | 0 580 106 A3 | 1/1994 |
| EP | 0 736 853 A1 | 9/1996 |
| JP | A-8-128840 | 5/1996 |
| JP | A-10-39746 | 2/1998 |
| JP | A-2001-56228 | 2/2001 |
| JP | A-2002-107167 | 4/2002 |
| JP | A-2003-22085 | 1/2003 |
| JP | 2003-194565 * | 7/2003 |

* cited by examiner

Primary Examiner—Michael J. Zanelli
(74) Attorney, Agent, or Firm—Posz Law Group, PLC

(57) ABSTRACT

In a route guidance system, when depression of a PTT switch is detected in the middle of voice guidance of respective guidance landmarks located in a guidance route, recognition of a voice command inputted through a microphone is initiated, When the recognized voice command is identified as one of a next setting command and a return setting command, the voice guidance of the guidance landmarks is sequentially provided starting from a corresponding one of a previous guidance landmark and a next guidance landmark in consistency with the one of the next setting command and the return setting command. When the recognized voice command is other than the next setting command and the return setting command, setting and/or resetting of the guidance route are performed based on the type of the corresponding guidance landmark and the recognized command.

10 Claims, 6 Drawing Sheets

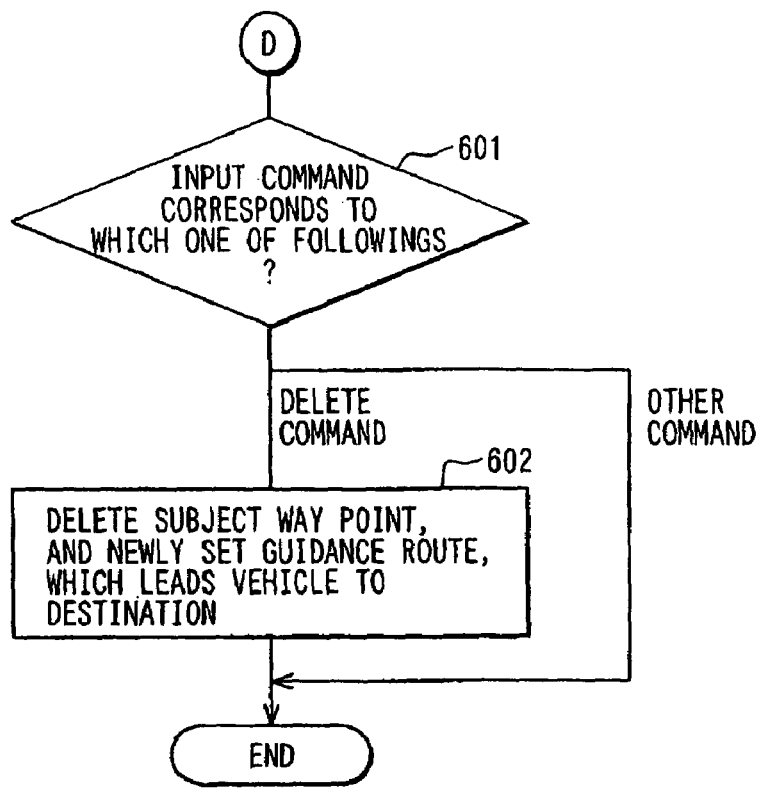
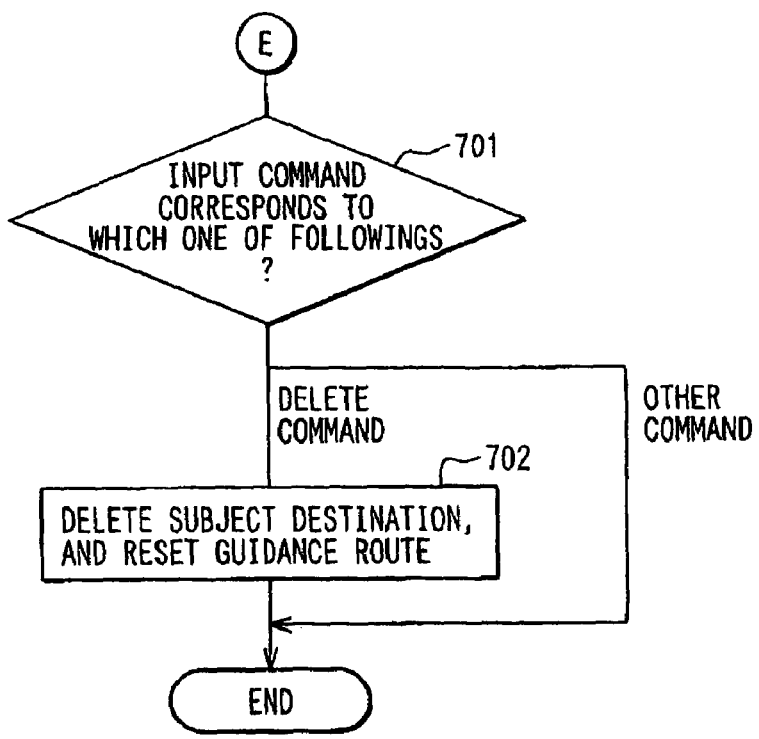

ROUTE GUIDANCE SYSTEM HAVING VOICE GUIDANCE CAPABILITY

CROSS REFERENCE TO RELATED APPLICATION

This application is based on and incorporates herein by reference Japanese Patent Application No. 2003-104398 filed on Apr. 8, 2003.

BACKGROUND OF THE INVENTION

1. Field of the Invention

The present invention relates to a route guidance system, which searches a guidance route to a destination and provides voice guidance of respective guidance landmarks located in the guidance route.

2. Description of Related Art

One exemplary prior art system, which sets a guidance route based on context of a voice command of a user, is a navigation system recited in Japanese Unexamined Patent Publication No. 2002-107167.

In the prior art system, the context of voice command of the user is divided into a plurality of simple sentences based on a preset syntax, and a destination is set by analyzing the context of each divided simple sentence, More specifically, when the user speaks "set a third building, which is located on a right side of a road encountered right after passing straight through the Yokohama station's west exit, as a destination", this voice command is divided into two simple sentences, i.e., the sentence of "passing straight through the Yokohama station's west exit" and the sentence of "setting the third building, which is located on the right side of the road, as the destination". Next, the Yokohama station's west exit is searched and is identified from map data based on the sentence of "passing straight through the Yokohama station's west exit", and the road, which passes straight through the Yokohama station's west exit, is searched and is identified. Finally, the third building, which is located on the right side of the searched road that passes straight through the Yokohama station's west exit, is searched and is identified. This building is set as the destination, and the corresponding navigation is performed.

As described above, in the prior art system, the destination and the guidance route is set when the geographical information around the destination is inputted to the system through the voice of the user. However, when the user is not familiar with the geographical information around the destination, for example, at the time of visiting the destination first time, the user cannot set the destination and the guidance route through his/her voice. Besides the above system, another route guidance system is known. This route guidance system searches and notifies a guidance route to a destination, which is manually set by a user based on map information, according to, for example, a Dijkstra method. However, even in this route guidance system, it is difficult to set a user's intended guidance route.

SUMMARY OF THE INVENTION

The present invention addresses the above disadvantages. Thus, it is an objective of the present invention to provide a route guidance system, which enables setting of a user's intended destination and a user's intended guidance route through voice of the user even when the user is not familiar with geographical information around the destination.

To achieve the objective of the present invention, there is provided a route guidance system for a vehicle. The route guidance system includes a route setting means, a voice guidance means, an instructing means, a command input means and an editing means. The route setting means is for setting a guidance route to a destination. The voice guidance means is for providing voice guidance of respective guidance landmarks located in the set guidance route before starting driving of the vehicle along the guidance route. The instructing means is for requesting an editing operation of a currently guided portion of the guidance route while the voice guidance means is providing the voice guidance of the respective guidance landmarks located in the guidance route set by the route setting means. The currently guided portion of the guidance route corresponds to a current one of the guidance landmarks currently guided by the voice guidance means. The command input means is for inputting a voice command. The voice command indicates details of the editing operation, which is requested from the instructing means to edit the currently guided portion of the guidance route. The editing means is for performing the editing operation of the currently guided portion of the guidance route based on the details of the editing operation, which is indicated by the voice command inputted from the command input means.

BRIEF DESCRIPTION OF THE DRAWINGS

The invention, together with additional objectives, features and advantages thereof, will be best understood from the following description, the appended claims and the accompanying drawings in which:

FIG. 6 is a flowchart showing a part of the process performed by the route guidance system of the present embodiment to newly set a guidance route based on an inputted command when the type of the guidance landmark, which is currently voice-guided, is identified as a way point;

FIG. 7 is a flowchart showing a part of the process performed by the route guidance system of the present embodiment to newly set a guidance route based on an inputted command when the type of the guidance landmark, which is currently under the voice guidance, is identified as a destination.

DETAILED DESCRIPTION OF THE INVENTION

An embodiment of the present invention will be described with reference to the accompanying drawings.

Figure 1:
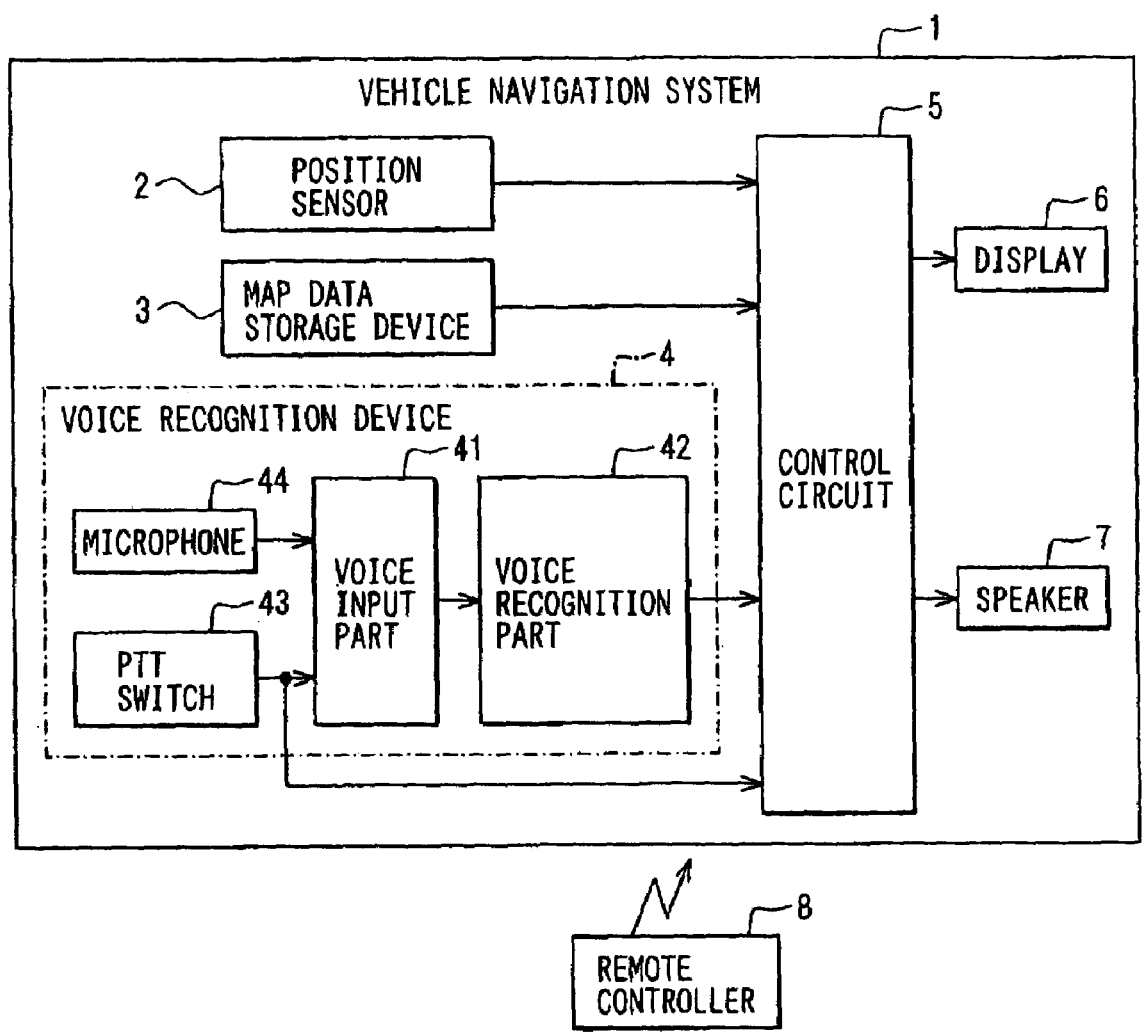
FIG. 1 is a block diagram showing an entire structure of a route guidance system according to an embodiment of the present invention.

A route guidance system of the present embodiment is embodied in a vehicle navigation system (including car navigation system) 1 shown in FIG. 1. The vehicle navigation system 1 includes a position sensor 2, a map data storage device 3, a voice recognition device 4, a control circuit 5, a display 6 and a speaker 7.

The position sensor 2 includes known devices, such as a magnetic field sensor, a gyroscope, a distance sensor and a GPS receiver. The GPS receiver senses location of the vehicle based on radio waves transmitted from satellites. The position sensor 2 obtains a current position of the vehicle through interpolation of information outputted from these devices and outputs the current position of the vehicle to the control circuit 5 as position data. Depending on a required degree of sensing accuracy, only one or more of the above devices can be selectively used. Furthermore, it should be noted that any other sensor, such as a rotation sensor of a steering wheel and/or a wheel sensor of each rotating wheel, can used.

The map data storage device 3 includes, for example, a CD-ROM. The map data storage device 3 stores map data, which at least includes various road information, building information and boat slip position information. The map data can be alternatively stored in, for example, a hard disk, a DVD-ROM or any other appropriate storage device.

The voice recognition device 4, which serves as a command input means, includes a voice input part 41, a voice recognition part 42, a push to talk (PTT) switch 43 and a microphone 44.

The voice input part 41 includes, for example, a compact A/D converter. The voice input part 41 obtains voice signals, which are outputted from the microphone 44, and converts the obtained voice signals into digital data to generate corresponding voice data only when the PTT switch 43, which serves as an instructing means, is depressed, i.e., is turned on. When the PTT switch 43 is not depressed, the above process is not performed. The generated voice data is outputted to the voice recognition part 42. It should be noted that the PTT switch 43 can be alternatively provided in a remote controller 8 or can be alternatively provided as one of undepicted operation keys of the vehicle navigation system. A switch provided in the remote controller 8 may be used to request initiation of the voice guidance of the respective guidance landmarks. Alternatively, the PTT switch 43 or another one of the undepicted operation keys of the vehicle navigation system may be used to request initiation of the voice guidance of the respective guidance landmarks.

The voice recognition part 42 stores a voice pattern of each command in a form of dictionary data. The voice command is used by a user to instruct details of an editing operation of the guidance route through his/her voice. The voice recognition part 42 computes a degree of coincidence between the voice pattern of each command, which is contained in the dictionary data, and the subject voice data, which is obtained from the voice input part 41. Then, the voice recognition part 42 recognizes the command of the voice pattern, which shows the highest degree of coincidence with respect to the obtained subject data, as the voice command of the user. Thereafter, the voice recognition part 42 outputs a command signal, which indicates the recognized command, to the control circuit 5. The dictionary data of the present embodiment includes voice patterns of twelve commands, which include a detour command, a straight through command, a right turn command, a left turn command, a U-turn command, a delete command, an inbound setting command, an outbound setting command, a destination setting command, a way point setting command, a next setting command and a return setting command.

The control circuit 5, which at least serves as an editing means, is a known computer. The control circuit 5 sets a best guidance route to the destination and performs a known navigation operation. More specifically, when the command for setting the guidance route is inputted through the remote controller 8, the control circuit 5 searches a best travel route from a current location of the vehicle to the preset destination based on the position data, which is outputted from the position sensor 2 and also based on preset way points and the preset destination, which are previously inputted through the remote controller 8, with reference to the map data stored in the map data storage device 3. Then, the control circuit 5 sets the searched best travel route as a corresponding guidance route. Next, the control circuit 5 retrieves corresponding map data, which includes the corresponding guidance route, from the map data storage device 3. Thereafter, the control circuit 5 generates guidance image data, in which the guidance route is indicated by a notable color that is different from roads other than those included in the guidance route. Then, the control circuit 5 outputs the thus generated guidance image data to the display 6 to perform the navigation operation. A search method for searching the best travel route maybe one of known search methods, such as a Dijkstra method, and thus will not be described further.

The control circuit 5 incrementally numbers a series of guidance landmarks, which are located one after the other in order in the preset guidance route from the current location to the destination. It should be noted that the guidance landmarks include six types of guidance landmarks, i.e., a road, an intersection, a way point, a destination, an interchange of a highway (hereinafter referred to as "a highway IC") and a boat slip in the present embodiment. In the present embodiment, the highway may include a freeway, a toll highway, expressway, motorway or the like. The control circuit 5 uses the incremental numbers as guidance numbers of the guidance landmarks. More specifically, a guidance number 1 is assigned to one of the guidance landmarks, which is closest to the current location of the vehicle in the guidance route, and the guidance number of the destination is equal to the tonal number of the guidance landmarks. When voice guidance of the guidance route is instructed through, for example, the remote controller 8, the voice guidance data of each guidance landmark is generated and is outputted to the speaker 8 in the order of the assigned guidance numbers to provide the voice guidance of each guidance landmark.

Particularly, in the present embodiment, when the control circuit 5 detects depression of the PTT switch 43 of the voice recognition device 4 in the middle of the voice guidance operation, the control circuit 5 classifies the current guidance landmark, which is currently voice-guided by the route guidance system, into one of the six types, i.e., the road, the intersection, the way point, the destination, the highway IC and the boat slip. Then, the control circuit 5 reroutes and/or resets (edits) the guidance route based on the type of the current guidance landmark and the command signal outputted from the voice recognition device 4. The above process will be described in greater detail below.

The display 6 is, for example, an in-vehicle liquid crystal display. The display 6 obtains the guidance image data, which is outputted from the control circuit 5, and displays the guidance image. The speaker 7 obtains the voice guidance data, which is outputted from the control circuit 5, and provides the voice guidance.

Figure 2:
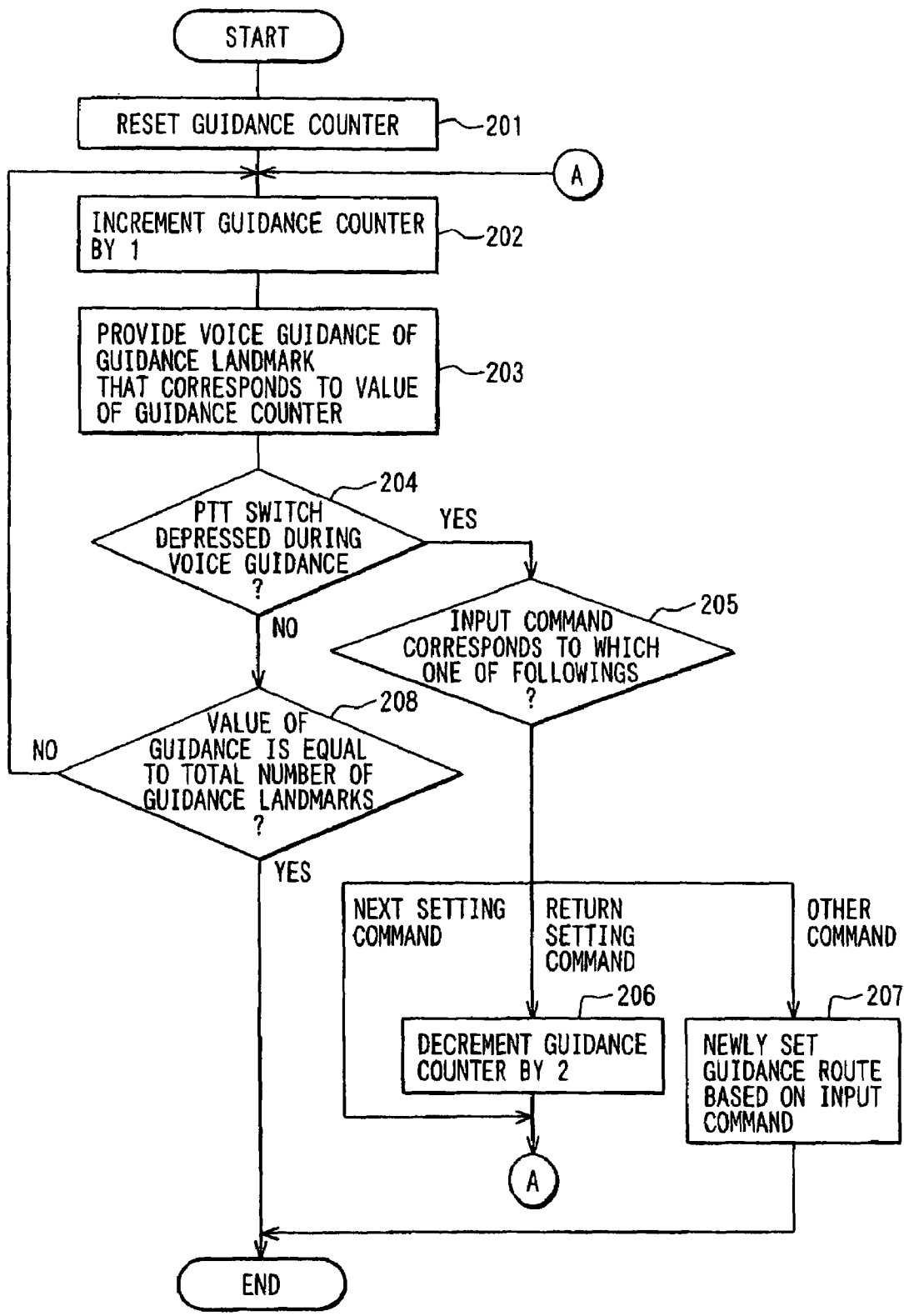
FIG. 2 is a flowchart showing a process performed by the route guidance system of the present embodiment to provide guidance of respective guidance landmarks located in the guidance route.

FIG. 2 is a flowchart showing a process of the route guidance system of the present embodiment for performing the voice guidance of respective guidance landmarks located in the guidance route and for editing corresponding each of the guidance landmarks in advance. The process of the flowchart is executed each time the voice guidance is instructed through the remote controller 8.

At step 201, the control circuit 5 resets a guidance counter provided in the control circuit 5. At step 202, a value of the guidance counter is incremented by 1. When the value of the guidance counter exceeds the total number of the guidance landmarks located in the guidance route, the value of the guidance counter will be forcefully set to a number that is equal to the total number of the guidance landmarks located in the guidance route. At step 203, the voice guidance data of the guidance landmark, which has the assigned guidance number equal to the current value of the guidance counter, is generated and is outputted to the speaker 7 to perform the voice guidance.

At step 204, it is determined whether the PTT switch 43 has been depressed during the voice guidance performed at step 203. When it is determined that the PTT switch 43 has been depressed, control proceeds to step 205. By contrast, when it is determined that the PTT switch 43 has not been depressed, control proceeds to step 208.

At step 205, the command, which is inputted from the microphone 44, is classified as one of the next setting command, the return setting command and any other command. When the command, which is inputted from the microphone 44, is classified as the next setting command, control returns to step 202 and provides the voice guidance for the following landmark(s) starting from a next guidance landmark, which is located right after the currently guided landmark. When the command, which is inputted from the microphone 44, is identified as the return setting command, control proceeds to step 206. At step 206, the value of the guidance counter is decremented by 2. When the decrement causes the value of the guidance counter to be less than zero, the value of the guidance counter is forcefully set to zero. Thereafter, control returns to step 202 and performs the voice guidance of the following guidance landmark(s) starting from a previous guidance landmark, which is located immediately before the currently guided guidance landmark. In this way, the user can easily change, through his/her voice, the guidance landmark to be voice-guided.

By contrast, when the command other than the next setting command and the return setting command is inputted through the microphone 44, control proceeds to step 207. At step 207, the guidance route is rerouted, i.e., is newly set based on the inputted command, and control ends the current process. This step will be described in greater detail below.

At step 208, it is determined whether the value of the guidance counter is equal to the total number of the guidance landmarks, that is, whether the voice guidance of all the guidance landmarks has been completed. When the value of the guidance counter is equal to the total number of the guidance landmarks, it is determined that the voice guidance of all the guidance landmarks has been completed, and control ends the current process. Otherwise, control returns to step 202 and repeats the above process.

As described above, when the respective guidance landmarks, which are located in the preset guidance route, are sequentially voice-guided from the start point to the destination along the guidance route, the user can have a more realistic image of the guidance route to allow easy editing work of the guidance route.

FIGS. 3 to 8 show various portions of the flowchart that indicates the process performed by the route guidance system of the present embodiment for rerouting and/or resetting the guidance route based on the inputted command. The portions of the flowchart shown in FIGS. 3–8 correspond to step 207 of the above-described flowchart of FIG. 2. The process starts at step 301 of FIG. 3.

Figure 3:
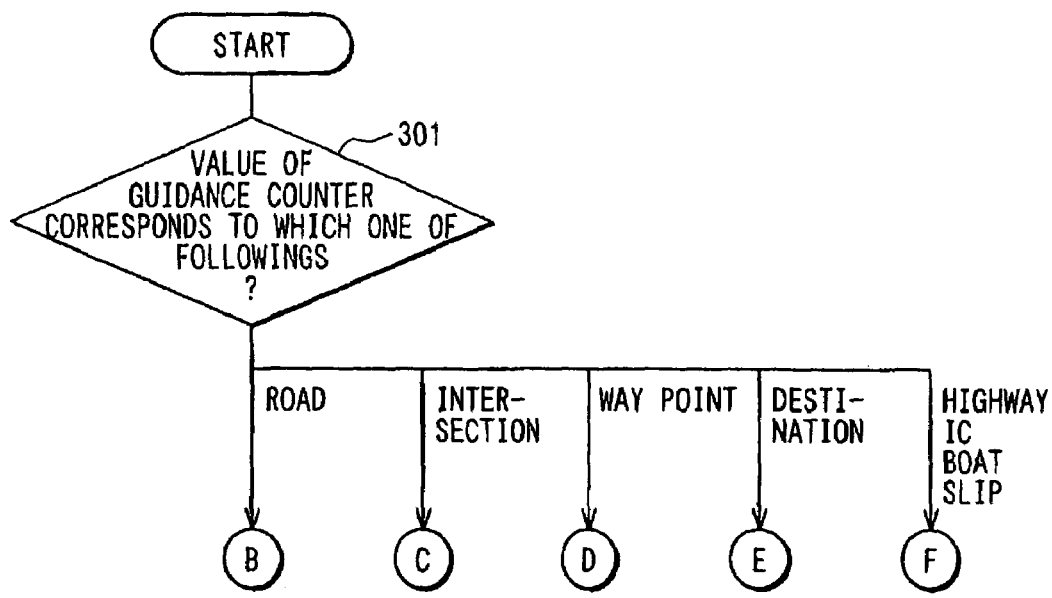
FIG. 3 is a flowchart showing a part of the process performed by the route guidance system of the present embodiment to identify a type of a current guidance landmark that is currently under voice guidance.

FIG. 3 shows a part of the process of the present flowchart for identifying the type of the current guidance landmark that is currently voice-guided.

At step 301, the control circuit 5 classifies the current guidance landmark, which is assigned the guidance number that is equal to the current value of the guidance counter, into one of the multiple types, i.e., the road, the intersection, the way point, the destination, the highway IC and the boat slip. When the type of the current guidance landmark is classified as the road, control proceeds to step 401 of FIG. 4. When the type of the current guidance landmark is classified as the intersection, control proceeds to step 501 of FIG. 5. When the type of the current guidance landmark is classified as the way point, control proceeds to step 601 of FIG. 6. When the type of the current guidance landmark is classified as the destination, control proceeds to step 701 of FIG. 7. When the type of the current guidance landmark is classified as the highway IC or the boat slip, control proceeds to step 801 of FIG. 8.

Figure 4:
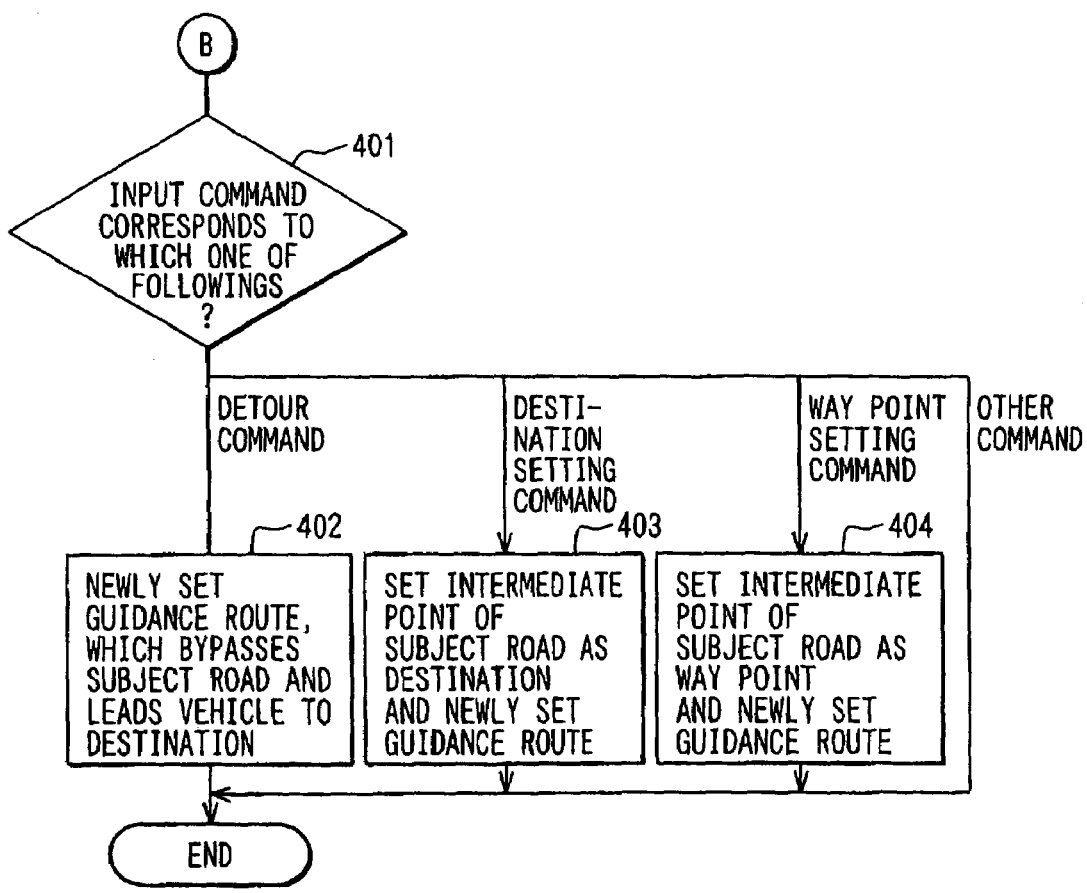
FIG. 4 is a flowchart showing a part of the process performed by the route guidance system of the present embodiment to newly set a guidance route based on an inputted command when the type of the guidance landmark, which is currently voice-guided, is identified as a road.

FIG. 4 shows another part of the process of the present flowchart for rerouting the guidance route based on the inputted command when the type of the current guidance landmark, which is currently voice-guided, is identified as the road.

At step 401, the control circuit 5 identifies the command, which is inputted through the microphone 44. When the inputted command is identified as the detour command, control proceeds to step 402. When the inputted command is identified as the destination setting command, control proceeds to step 403. When the inputted command is identified as the way point setting command, control proceeds to step 404. When the inputted command is identified as any other command, which is other than the above commands, control terminates the current process.

At step 402, a new route, which bypasses the subject road identified as the guidance landmark and which leads the vehicle to the destination, is newly searched and is newly set as a new guidance route, and control ends the current process. In this way, even when the subject road, which is located in the guidance route, is closed due to, for example, road construction or is jammed, the user can set the new guidance route, which bypasses the subject road, through his/her voice.

At step 403, an intermediate point of the subject road, which is identified as the current guidance route, is set as a new destination. Thereafter, a new route, which leads the vehicle to the newly set destination, is newly searched and is newly set as a new guidance route, and control ends the current process.

At step 404, an intermediate point of the subject road, which coincides with the current guidance route, is set as a way point. Thereafter, a new route, which leads the vehicle to the destination through the newly set way point, is newly searched and is set as a new guidance route, and control ends the current process. In this way, the user can set the new guidance route, in which the new way point or the new destination is set, through his/her voice.

Figure 5:
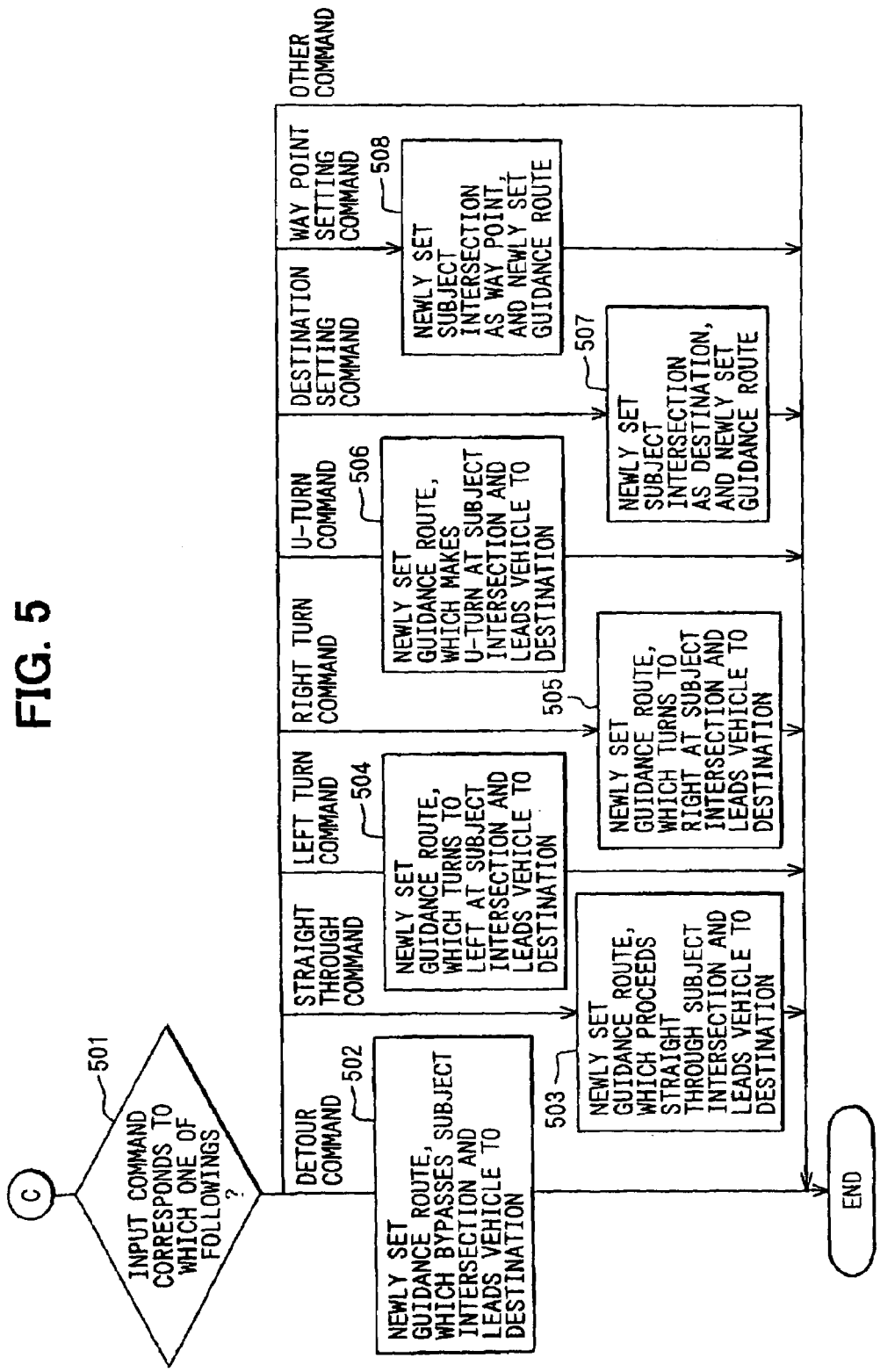
FIG. 5 is a flowchart showing a part of the process performed by the route guidance system of the present embodiment to newly set a guidance route based on an inputted command when the type of the guidance landmark, which is currently voice-guided, is identified as an intersection.

FIG. 5 shows another part of the flowchart. Here, the guidance route is rerouted based on the inputted command when the type of the current guidance landmark, which is currently voice-guided by the route guidance system, is classified as the intersection.

At step 501, the control circuit 5 identifies the command, which is inputted through the microphone 44. When the inputted command is identified as the detour command, control proceeds to step 502. When the inputted command is identified as the straight through command, control proceeds to step 503. When the inputted command is identified as the left turn command, control proceeds to step 504. When the inputted command is identified as the right turn command, control proceeds to step 505. When the inputted command is identified as the U-turn command, control proceeds to step 506. When the inputted command is identified as the destination setting command, control proceeds to step 507. When the inputted command is identified as the way point setting command, control proceeds to step 508. When the inputted command is identified as the other command, which is other than the above commands, control terminates the current process.

At step 502, a new route, which bypasses the subject intersection identified as the guidance landmark and which leads the vehicle to the destination, is newly searched and is newly set as a new guidance route, and control ends the current process.

At step 503, a new route, which proceeds straight through the subject intersection and which leads the vehicle to the destination, is newly searched and is newly set as a new guidance route, and control ends the current process. At step 504, a new route, which turns left at the subject intersection and which leads the vehicle to the destination, is newly searched and is newly set as a new guidance route, and control ends the current process. At step 505, a new route, which turns right at the subject intersection and which leads the vehicle to the destination, is newly searched and is newly set as a new guidance route, and control ends the current process. At step 506, a new route, which makes a U-turn at the subject intersection and which leads the vehicle to the destination, is newly searched and is newly set as a new guidance route, and control ends the current process. In this way, the user can provide specific instructions with respect to the rerouting of the guidance route through selection of the course achieved by commanding one of the proceeding straight through, the turning right, the turning left and the making the U-turn via his/her voice at any given intersection located in the guidance route.

At step 507, the subject intersection is newly set as a new destination. Thereafter, a new route, which leads the vehicle to the newly set destination, is newly searched and is newly set as a new guidance route, and control ends the current process. At step 508, the subject intersection is newly set as a way point. Thereafter, a new route, which leads the vehicle to the destination through the newly set way point, is newly searched and is newly set as a guidance route, and control ends the current process.

FIG. 6 shows another part of the flowchart. Here, the guidance route is rerouted based on the inputted command when the type of the current guidance landmark, which is currently voice-guided by the route guidance system, is classified as the way point. At step 601, the control circuit 5 identifies the command, which is inputted through the microphone 44. When the inputted command is identified as the delete command, control proceeds to step 602. At step 602, the subject way point is deleted. Thereafter, a new route, which leads the vehicle to the destination, is newly searched and is newly set as a new guidance route, and control ends the current process. In this way, even when it is no longer required to pass through the way points due to, for example, a change in the user's schedule, the user can set the new guidance route, in which the subject way point is deleted, through his/her voice. When the inputted command is the other command other than the delete command, control ends the current process.

FIG. 7 shows another part of the flowchart. Here, the guidance route is rerouted based on the inputted command when the type of the current guidance landmark, which is currently voice-guided by the route guidance system, is classified as the destination.

At step 701, the control circuit 5 identifies the command, which is inputted through the microphone 44. When the inputted command is identified as the delete command, control proceeds to step 702. At step 702, the subject destination is deleted, and the guidance route is reset. Then, control ends the current process. In this way, when the user deletes the destination, the guidance route is automatically reset, allowing easy operation of the system. When the inputted command is the other command other than the delete command, control ends the current process.

Figure 8:
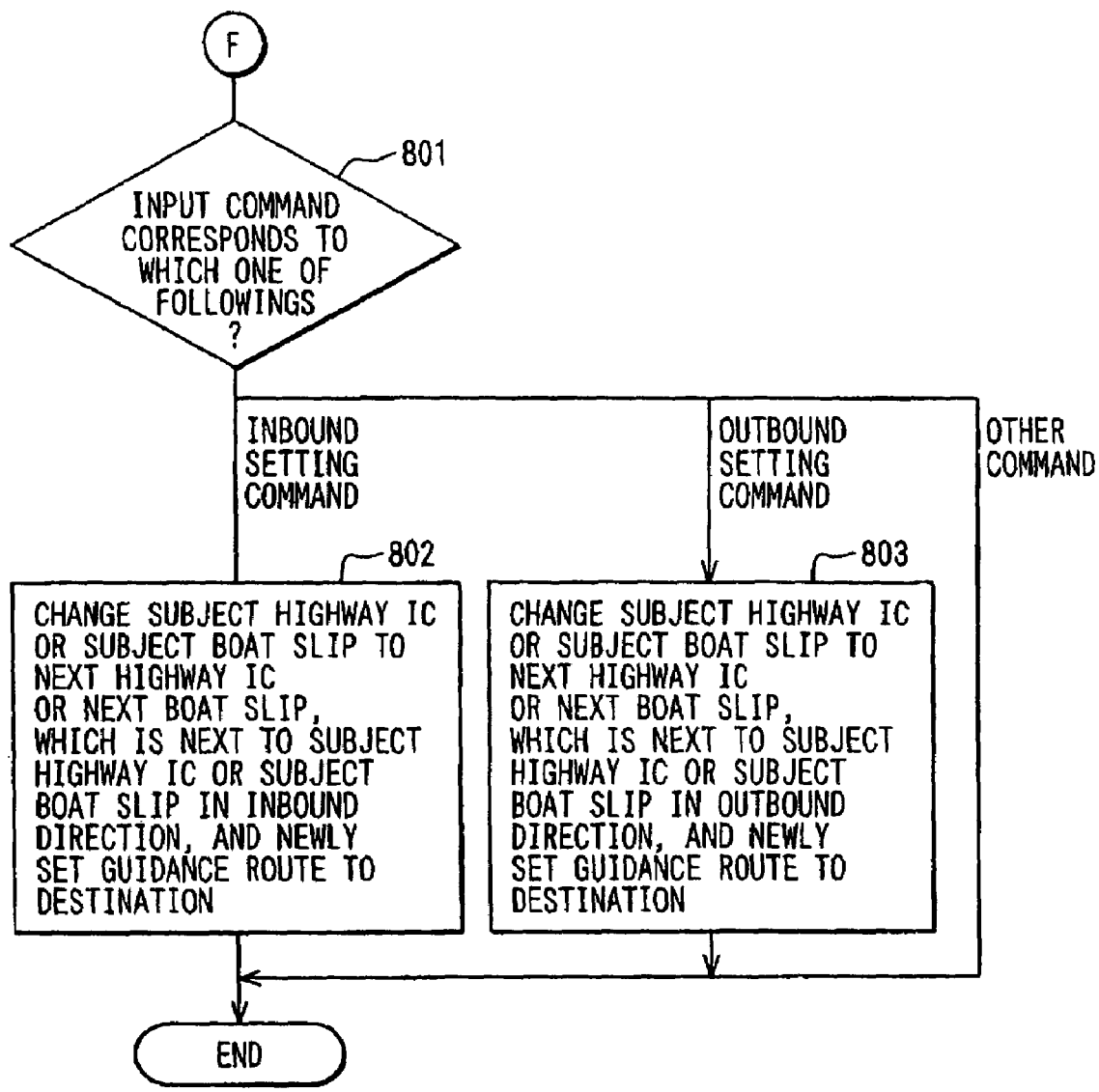
FIG. 8 is a flowchart showing a part of the process performed by the route guidance system of the present embodiment to newly set a guidance route based on an inputted command when the type of the guidance landmark, which is currently under the voice guidance, is identified as a highway IC or a boat slip.

FIG. 8 shows another part of the flowchart. Here, the guidance route is rerouted based on the inputted command when the type of the current guidance landmark, which is currently voice-guided by the route guidance system, is classified as the highway IC.

At step 801, the control circuit 5 identifies the command, which is inputted through the microphone 44. When the inputted command is identified as the inbound setting command, control proceeds to step 802. When the inputted command is identified as the outbound setting command, control proceeds to step 803. When the inputted command is the other command other than the inbound setting command and the outbound setting command, control ends the current process.

At step 802, the subject highway IC or the subject boat slip, which is identified as the guidance landmark, is changed to a corresponding next highway IC or a corresponding next boat slip, which is located immediately next to the subject highway IC or the subject boat slip in the inbound direction. Then, a new route, which passes through the newly set highway IC or the newly set boat slip and which leads the vehicle to the destination, is newly searched and is newly set as a new guidance route, and control ends the current process.

At step 803, the subject highway IC or the subject boat slip, which is identified as the guidance landmark, is changed to a corresponding next highway IC or a corresponding next boat slip, which is located immediately next to the subject highway IC or the subject boat slip in the outbound direction. Then, a new route, which passes through the newly set highway IC or the newly set boat slip and which leads the vehicle to the destination, is newly searched and is newly set as a new guidance route, and control ends the current process. In this way, when a traffic jam is expected in the subject highway or when estimated time of arrival of the vehicle to the subject boat slip is expected to be beyond departure time of a ship, to which the user is scheduled to board, the user can command through his/her voice to set the new guidance route, in which the subject highway IC or the subject boat slip is changed to the new highway IC or the new boat slip that is located next to the subject highway IC or the subject boat slip in the inbound direction or in the outbound direction. This allows flexible response.

As described above, in the route guidance system, when the PTT switch 43 is depressed in the middle of the voice guidance of the respective guidance landmarks located in the guidance route, the guidance route is rerouted and is reset based on the voice command inputted through the microphone 44. In this way, in the case where the user is not familiar with the location around the destination, for example, at the time of visiting the destination first time, the user can set the intended destination and the intended guidance route through his/her voice.

Additional advantages and modifications will readily occur to those skilled in the art. The invention in its broader terms is therefore not limited to the specific details, representative apparatus, and illustrative examples shown and described.

What is claimed is:

1. A route guidance system for a vehicle, the route guidance system comprising:
   a route setting means for setting a guidance route to a destination;
   a voice guidance means for providing voice guidance of respective guidance landmarks located in the set guidance route before starting driving of the vehicle along the guidance route;
   an instructing means for requesting an editing operation of a currently guided portion of the guidance route while the voice guidance means is providing the voice guidance of the respective guidance landmarks located in the guidance route set by the route setting means, wherein the currently guided portion of the guidance route corresponds to a current one of the guidance landmarks currently guided by the voice guidance means;
   a command input means for inputting a voice command, wherein the voice command indicates details of the editing operation, which is requested from the instructing means to edit the currently guided portion of the guidance route; and
   an editing means for performing the editing operation of the currently guided portion of the guidance route based on the details of the editing operation, which is indicated by the voice command inputted from the command input means.

2. The route guidance system according to claim 1, wherein the voice guidance means provides the voice guidance of the respective guidance landmarks in a sequence, which coincides with a sequence of the guidance landmarks arranged from a start point to the destination in the guidance route set by the route setting means.

3. The route guidance system according to claim 1, further comprising a switch for requesting the voice guidance of the respective guidance landmarks from the voice guidance means.

4. The route guidance system according to claim 1, wherein:
   when the currently guided portion of the guidance route, which corresponds to the current one of the guidance landmarks currently under the voice guidance and for which the editing operation is requested from the instructing means, is one of a road and an intersection, the command input means is enabled to receive a detour command as the voice command, wherein the detour command is for detouring the one of the road and the intersection; and
   when the currently guided portion of the guidance route, which corresponds to the current one of the guidance landmarks currently under the voice guidance and for which the editing operation is requested from the instructing means, is the one of the road and the intersection, and the voice command inputted to the command input means is the detour command, the editing means requests the route setting means to newly set a new guidance route, which detours the one of the road and the intersection and which leads the vehicle to the destination.

5. The route guidance system according to claim 1, wherein:
   when the currently guided portion of the guidance route, which corresponds to the current one of the guidance landmarks currently under the voice guidance and for which the editing operation is requested from the instructing means, is an intersection, the command input means is enabled to receive one of a straight through command for proceeding straight through the intersection, a right turn command for turning right at the intersection, a left turn command for turning left at the intersection, and a U-turn command for making a U-turn at the intersection as the voice command; and
   when the currently guided portion of the guidance route, which corresponds to the current one of the guidance landmarks currently under the voice guidance and for which the editing operation is requested from the instructing means, is the intersection, and the voice command inputted to the command input means is the one of the straight through command, the right turn command, the left turn command and the U-turn command, the editing means requests the route setting means to newly set a new guidance route, which takes a corresponding course at the intersection and which leads the vehicle to the destination, wherein the corresponding course corresponds to the one of the straight through command, the right turn command, the left turn command and the U-turn command and thus is a corresponding one of the proceeding straight through the intersection, the turning right at the intersection, the turning left at the intersection and the making the U-turn at the intersection.

6. The route guidance system according to claim 1, wherein:
   when the currently guided portion of the guidance route, which corresponds to the current one of the guidance landmarks currently under the voice guidance and for which the editing operation is requested from the instructing means, is a way point, the command input means is enabled to receive a delete command as the voice command, wherein the delete command is for deleting the way point from the guidance route; and
   when the currently guided portion of the guidance route, which corresponds to the current one of the guidance landmarks currently under the voice guidance and for which the editing operation is requested from the instructing means, is the way point, and the voice command inputted to the command input means is the delete command, the editing means requests the route setting means to newly set a new guidance route, from which the way point is deleted and which leads the vehicle to the destination.

7. The route guidance system according to claim 1, wherein:

when the currently guided portion of the guidance route, which corresponds to the current one of the guidance landmarks currently under the voice guidance and for which the editing operation is requested from the instructing means, is one of a highway interchange and a boat slip, the command input means is enabled to receive one of an inbound setting command and an outbound setting command as the voice command, wherein the inbound setting command is for changing the one of the highway interchange and the boat slip to a corresponding one of a next highway interchange and a next boat slip located next to the one of the highway interchange and the boat slip in an inbound direction, and the outbound setting command is for changing the one of the highway interchange and the boat slip to a corresponding one of a next highway interchange and a next boat slip located next to the one of the highway interchange and the boat slip in an outbound direction; and when the currently guided portion of the guidance route, which corresponds to the current one of the guidance landmarks currently under the voice guidance and for which the editing operation is requested from the instructing means, is the one of the highway interchange and the boat slip, and the voice command inputted to the command input means is the one of the inbound setting command and the outbound setting command, the editing means requests the route setting means to change the one of the highway interchange and the boat slip to the corresponding one the next highway interchange and the next boat slip located next to the one of the highway interchange and the boat slip in a corresponding one of the inbound direction and the outbound direction in consistency with the one of the inbound setting command and the outbound setting command.

8. The route guidance setting system according to claim 1, wherein:

the command input means is enabled to receive one of a destination setting command and a way point setting command as the voice command regardless of a type of the currently guided portion of the guidance route, which corresponds to the current one of the guidance landmarks currently under the voice guidance and for which the editing operation is requested from the instructing means, wherein the destination setting command is for setting the current one of the guidance landmarks as a new destination, and the way point setting command is for setting the current one of the guidance landmarks as a new way point; and when the voice command, which is inputted to the command input means, is one of the destination setting command and the way point setting command, the editing means requests the route setting means to newly set the currently guided portion of the guidance route as a corresponding one of the new destination and the new way point in consistency with the one of the destination setting command and the way point setting command and also to newly set a new guidance route, which leads the vehicle to the destination that is lately set.

9. The route guidance setting system according to claim 1, wherein:

the command input means is enabled to receive one of a next setting command and a return setting command as the voice command regardless of a type of the currently guided portion of the guidance route, which corresponds to the current one of the guidance landmarks currently under the voice guidance and for which the editing operation is requested from the instructing means, wherein the next setting command is for providing the voice guidance of a next one of the guidance landmarks, which is scheduled to be guided right after the current one of the guidance landmarks, and thereafter for sequentially providing the voice guidance of the rest of the guidance landmarks located after the next one of the guidance landmarks along the guidance route, and the return setting command is for providing the voice guidance of a previous one of the guidance landmarks, which has been guided right before the current one of the guidance landmarks, and thereafter for sequentially providing the voice guidance of the rest of the guidance landmarks located after the previous one of the guidance landmarks along the guidance route; and when the voice command, which is inputted to the command input means, is the one of the next setting command and the return setting command, the editing means requests the voice guidance means to provide the voice guidance of a corresponding one of the next one of the guidance landmarks and the previous one of the guidance landmarks in consistency with the one of the next setting command and the return setting command and thereafter to sequentially provide the voice guidance of the rest of the guidance landmarks located after the corresponding one of the next one of the guidance landmarks and the previous one of the guidance landmarks along the guidance route.

10. The route guidance setting system according to claim 1, wherein:

when the currently guided portion of the guidance route, which corresponds to the current one of the guidance landmarks currently under the voice guidance and for which the editing operation is requested from the instructing means, is the destination, the command input means is enabled to receive a delete command as the voice command, wherein the delete command is for deleting the destination from the guidance route; and when the currently guided portion of the guidance route, which corresponds to the current one of the guidance landmarks currently under the voice guidance and for which the editing operation is requested from the instructing means, is the destination, and the voice command inputted to the command input means is the delete command, the editing means deletes the destination and ends the editing operation after resetting the guidance route, which is set by the route setting means.

* * * * *